Figure 1:
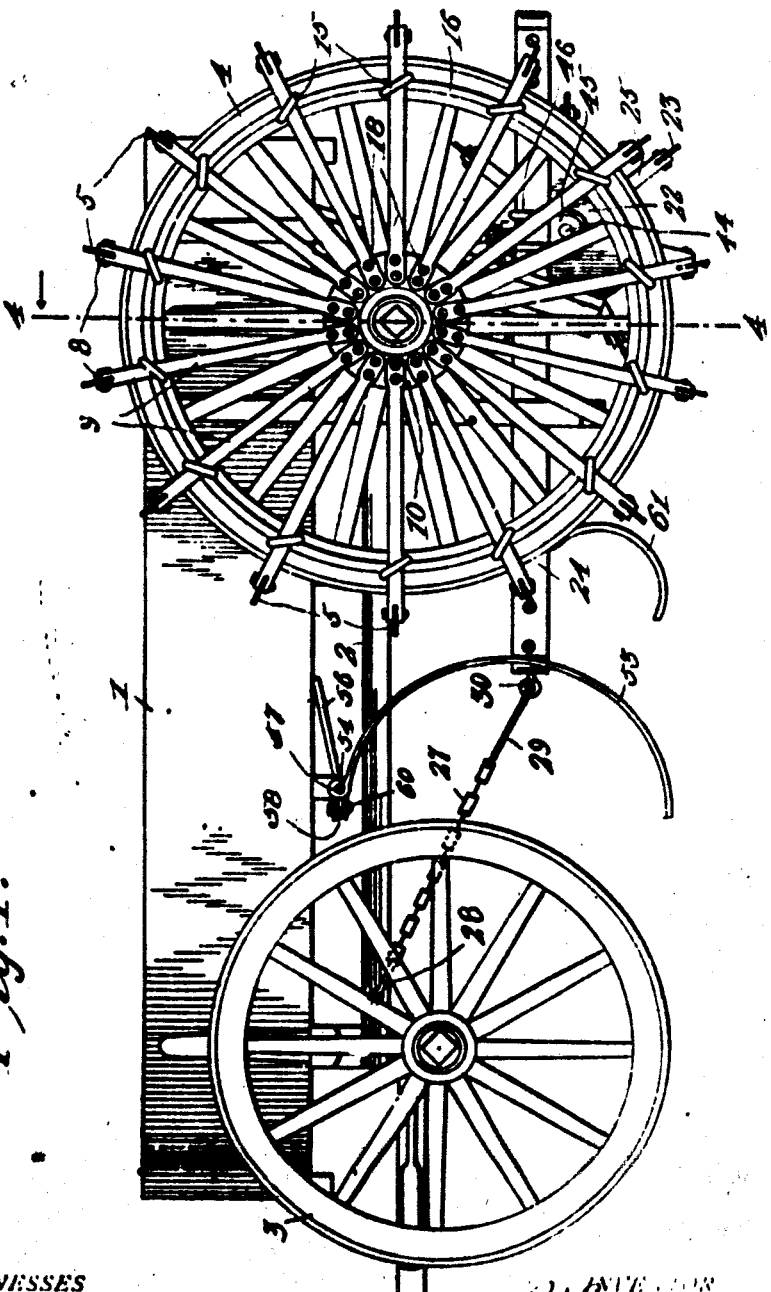

W. R. LEMONS.
STALK CUTTER.
APPLICATION FILED JUNE 2, 1909.

948,423.

Patented Feb. 8, 1910.
5 SHEETS—SHEET 1.

WITNESSES
James F. Crown
E. M. Ricketts

INVENTOR
W. R. Lemons
By Watson E. Coleman

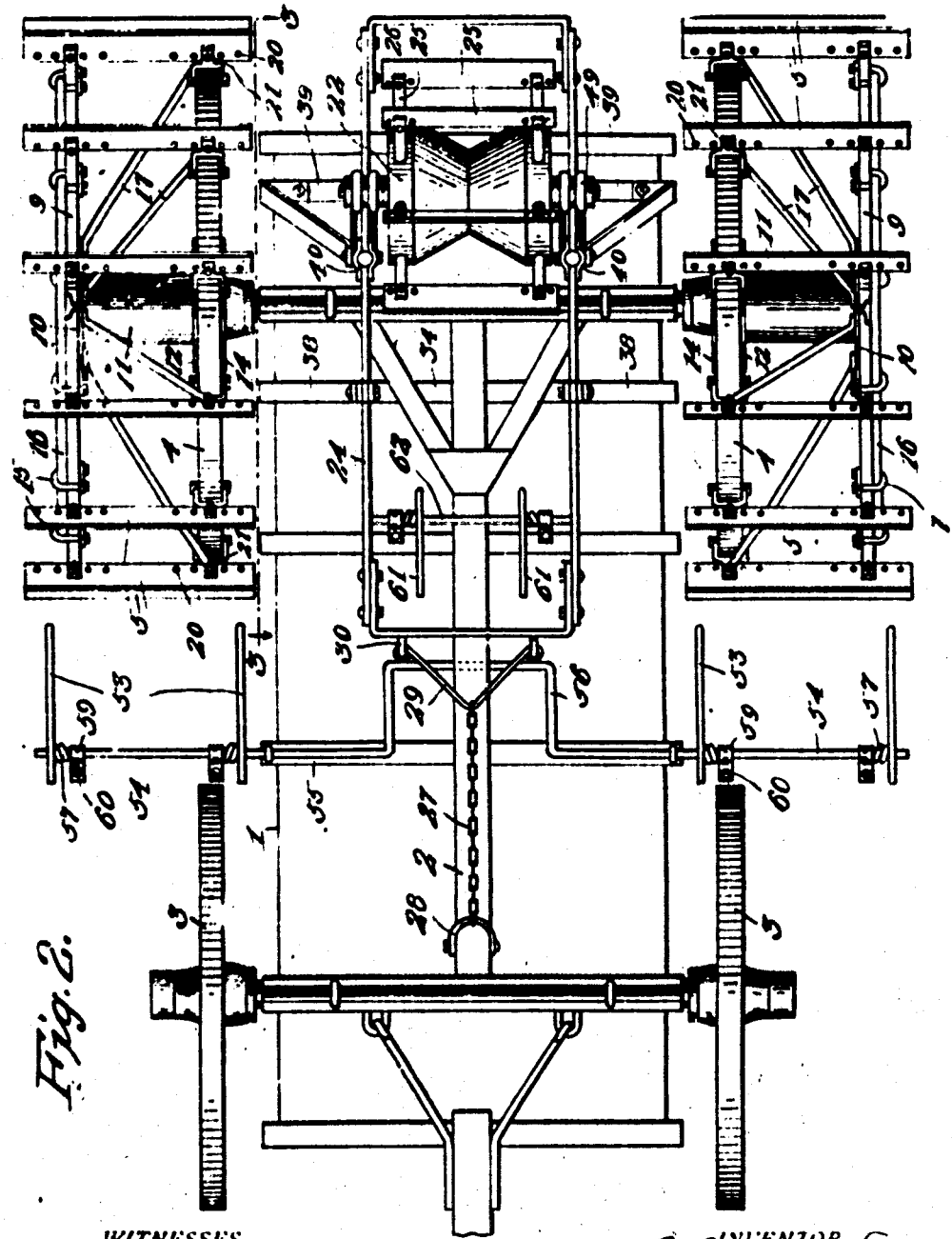

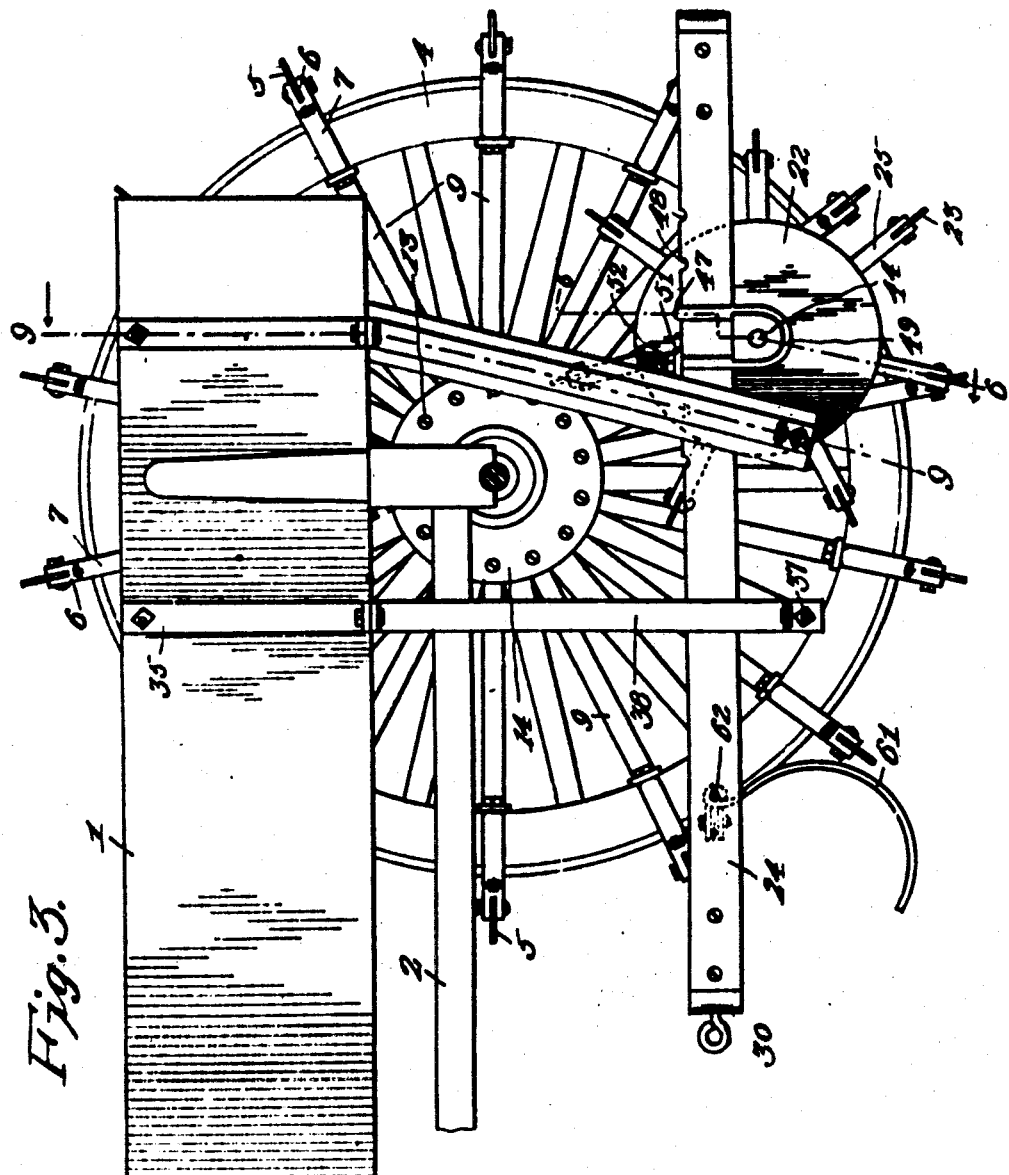

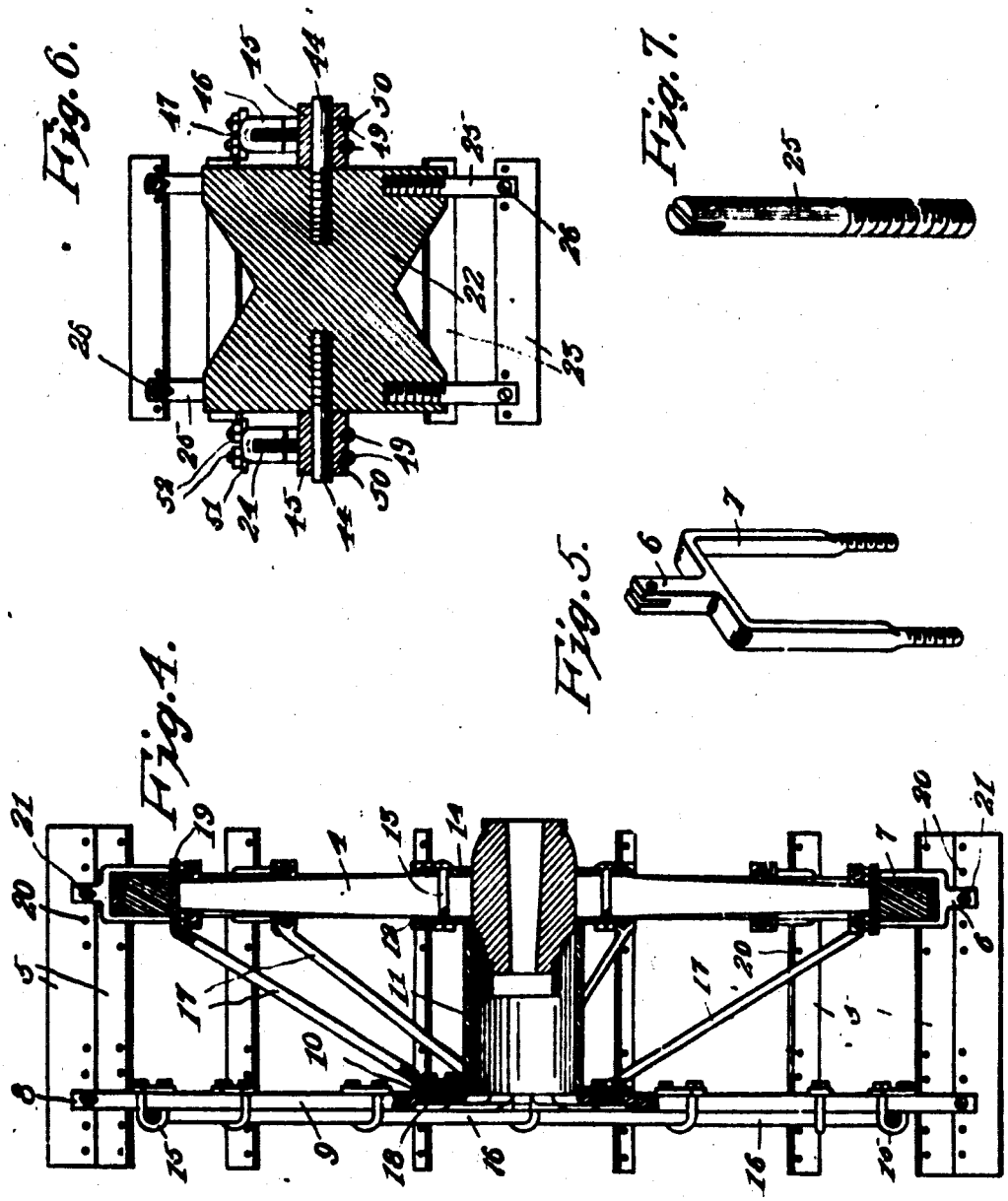

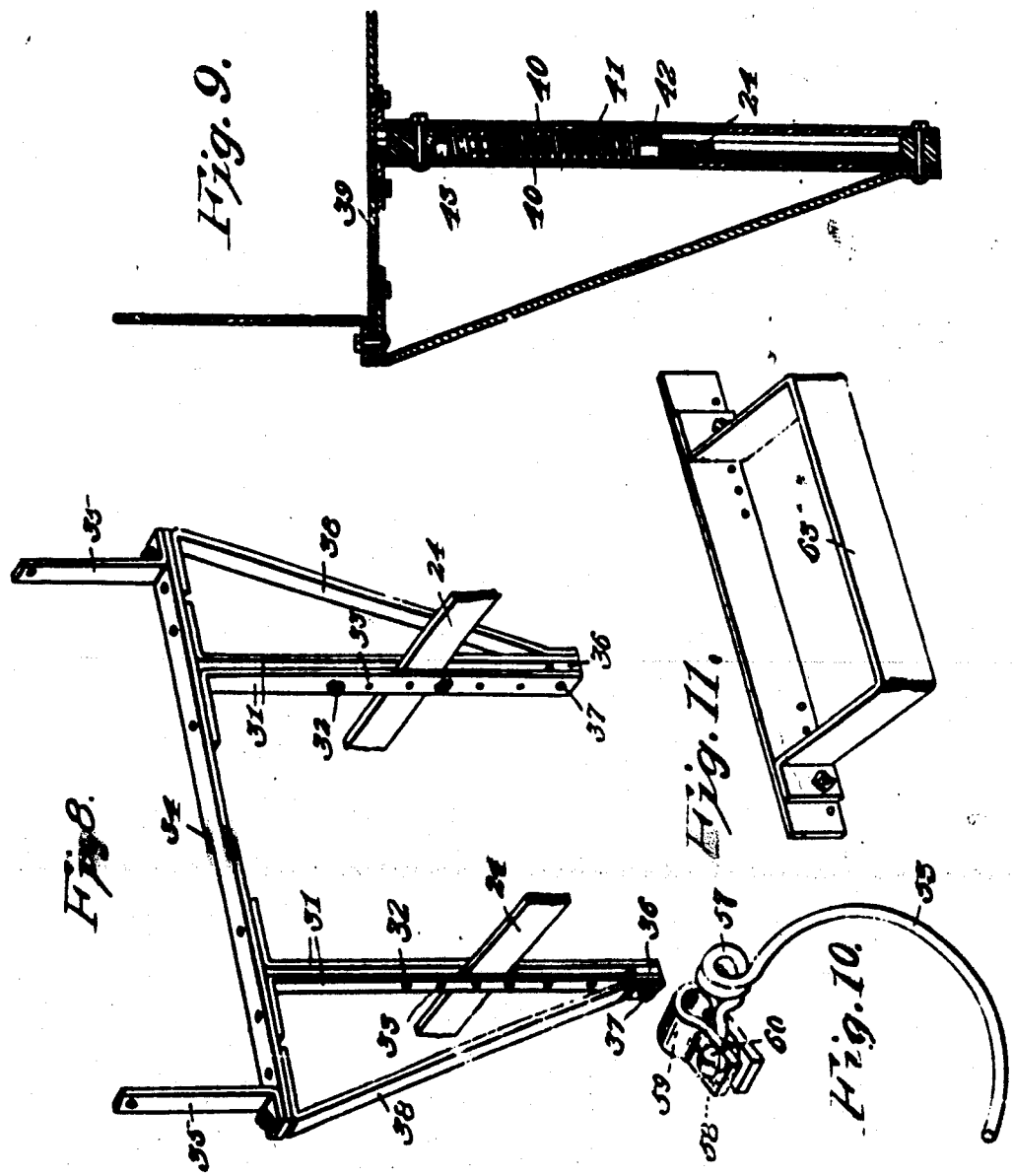

UNITED STATES PATENT OFFICE.

WILLIAM R. LEMONS, OF CATALINE, TEXAS.

STALK-CUTTER.

948,433.  Specification of Letters Patent.  Patented Feb. 8, 1910.

Application filed June 8, 1909. Serial No. 500,950.

*To all whom it may concern:*

Be it known that I, WILLIAM R. LEMONS, a citizen of the United States, residing at Cataline, in the county of Hemphill and State of Texas, have invented certain new and useful Improvements in Stalk-Cutters, of which the following is a specification, reference being had to the accompanying drawings.

This invention relates to improvements in stalk cutting devices.

One object of the invention is to provide a simple, practical and efficient machine of this character which will operate simultaneously on three rows of stalks, thereby enabling the work to be quickly performed.

Another object of the invention is to provide a stalk cutting mechanism in the form of an attachment which may be applied to an ordinary farm wagon without altering the construction of the same.

A further object of the invention is to provide a cutting blade attachment for ready application to a wheel of a wagon, agricultural implements or the like.

A further object of the invention is to improve and simplify the construction and operation of stalk cutting machines of this character and thereby render the same more durable and efficient and less expensive.

With the above and other objects in view, the invention consists of the novel features of construction and the combination and arrangement of parts hereinafter fully described and claimed, and illustrated in the accompanying drawings, in which—

Figure 1 is a side elevation of the preferred embodiment of my invention, the same being in the form of an attachment for use on an ordinary farm wagon; Fig. 2 is a bottom plan view of the same; Fig. 3 is a detail vertical section on an enlarged scale, the plane of the section being indicated by the line 3—3 in Fig. 2; Fig. 4 is a sectional view through one of the rear wheels of the wagon and the cutting blade attachment thereon, the plane of the section being indicated by the line 4—4 in Fig. 1; Fig. 5 is a detail perspective view of one of the blade attaching clamps; Fig. 6 is a detail section taken on the plane indicated by the line 6—6 in Fig. 3; Fig. 7 is a perspective view of one of the blade fastening members for the spring pressed wheel; Fig. 8 is a detail perspective view of the front guide frame for the swinging frame of the spring pressed cutting wheel; Fig. 9 is a detail section showing the spring device, the plane of the section being indicated by the line 9—9 in Fig. 3; Fig. 10 is a detail perspective view of one of the sweep or rake teeth and its attaching clamp; and Fig. 11 is a detail perspective view of a modified form of blade which may be used on the wheels when it is desired to use the machine for chopping cotton.

In the drawings 1 denotes the body of an ordinary farm wagon, 2 denotes its reach bar, and 3 and 4 denote its front and rear wheels.

In the practice of the invention, each of the rear wheels 4 is converted into a cutting wheel to operate upon one row of stalks, said wheels being so converted by removably attaching to them a framework carrying an annular row of transverse cutting blades 5. The inner ends of the blades 5 are secured in bifurcated lugs 6 formed on U-shaped clamps 7 which straddle the rim of the wheel. The outer portions of said blades 5 are secured in bifurcated outer ends 8 of an annular series of radial spokes 9 the inner ends of which are secured to the flange 10 on the outer end of a tubular hub or sleeve 11 arranged upon the hub of the wheel 4. The inner end of the sleeve-like hub 11 has a similar flange 12 which bears against the outer faces of the spokes of the wheel 4 and which is clamped against the same by means of an annular series of bolts or similar fastenings 13 disposed between the spokes of the wheel and in a ring 14 arranged upon the inner faces of the wheel spokes, as clearly shown in Fig. 4. The outer portions of the spokes 9 are united by U-bolts or similar clips 15 to a circular ring 16, which latter supports them and holds them in spaced relation. To further strengthen the frame which secures the blades to the wheel 4, an annular series of diagonal braces 17 is provided. These braces have their converging ends engaged with the inner face of the flange 10 and secured thereto by bolts or similar fastenings 18 certain of which also serve to unite the inner ends of the spokes 9 to the flange 10. The diverging ends of the braces 17 are bent angularly, as shown at 19, to provide the cross pieces or plates of certain of the clamps or clips 7. By constructing the cutting wheels in this manner, it will be seen that they will be strong and durable and that the ordinary wagon wheel may be quickly converted into such a stalk cutting wheel; but it will be understood that, if desired, the cutting wheel may be made entirely independent of the wagon wheel.

The blades 5 are preferably laterally adjustable, that is, adjustable in a plane transversely of the wheel frame so that the cutting wheels which operate on alternate rows of stalks may be positioned according to the distance between such rows. This adjustment of the blades 5 is preferably effected by providing their inner edges adjacent their ends with longitudinal series of openings 20 in any of which may be inserted the bolts or other removable fastenings 21 which secure said blades in the bifurcated ends 6, 8 of the clamps 7 and spokes 9.

The above described cutting wheels operate on alternate rows and the intermediate row of stalks is cut by a third cutting wheel 22 carrying an annular series of cutting blades 23 and mounted in a vertical swinging frame 24 located beneath the wagon body or box 1 and between the rear wheels 4. Said wheel 22 is of cylindrical-shape having a grooved periphery and two annular rows of threaded sockets in which are screwed radial arms or spokes 25 for the blades 23. These blades 23 are similar to the blades 5 and are mounted in a similar manner, as shown at 26, that is to say, they are adjustable transversely of the wheel 22. The swinging frame 24 is preferably of rectangular shape and its front end is connected by a chain or other flexible connection 27 to the reach bar 2. The front end of said chain is connected to a U-bolt or clip 28 attached to the reach 2 and the rear end of said chain is connected to a V-shaped link 29 having eyes at its ends engaged with eyes 30 on the front end of the frame 24.

The front or intermediate portions of the side bars of the frame 24 are guided for vertical movement in a guide frame shown more clearly in Fig. 8 of the drawings. This frame consists of pairs of spaced guide bars 31 between which the side bars of the frame 24 are vertically movable, such movement, however, being limited by upper and lower stops 32. These stops are preferably in the form of bolts and they are vertically adjustable by arranging them in any of pairs of registering openings 33 formed in the bars 31. The bent upper ends of the bars 31 are united to a transverse connecting bar 34 which extends across the bottom of the wagon body 1 and has its ends secured to the sides of said body by means of upright attaching brackets 35, which latter may be fastened by screws, bolts or other removable fastenings. The lower ends of the guide bars 31 are spaced apart by blocks 36 and are united by transverse fastenings 37, which latter also attach to said lower ends of the side bars diagonal braces 38, the upper ends of which latter are secured to the ends of the connecting bar 34. The side bars of the frame 24 are further guided by a guide frame 39 which is similar to the above described guide frame but which has its pairs of spaced guide bars 40 (corresponding to the guide bars 31) formed with opposing concaved channels to receive between them coil springs 41. These springs are adapted to bear downwardly upon the upper edges of the side bars of the frame 24 to press the intermediate cutting wheel down upon the ground, it being understood that the weight of the wagon and its load holds the side cutting wheels upon the ground. The lower ends of the springs 41 are engaged with pins on plungers 42 which slide between the guide bars 40 and bear upon the upper edge of the side bars of the frame 24 and the upper ends of said springs 41 are engaged with similarly constructed stationary stop blocks 43 secured between the upper portions of the guide bars 40, as clearly shown in Fig. 9 of the drawings. In all other respects the construction of the frame 39 and its attachment to the wagon body is the same as that of the frame shown in Fig. 8. If desired, however, the lower portions of the frame 39 may be inclined in a downward and forward direction, as shown more clearly in Fig. 3, instead of being perpendicular as are the depending portions of the first mentioned frame.

The intermediate cutting wheel 22 is preferably made longitudinally adjustable on the frame 24 by mounting its shaft 44 in bearing blocks 45, which latter are held in contact with the bottom edge of the side bars of the frame 24 by means of adjustable clamps 46. Each of the latter is preferably constructed from a single metal rod by bending its central portion upon itself into U-shape to provide a part 47 which straddles one of the side bars of the frame and is seated in any one of a longitudinal series of notches 48 in said bar. The ends of such rod are then bent upon themselves into U-form to provide portions 49 which receive the bearing block 45 and are seated in grooves 50 therein, as will be understood on reference to Figs. 3 and 6 of the drawings. The extremities of said rod project above the upper edge of the side bar of the frame 24 and are united by a cross piece or plate 51 and nuts 52.

For the purpose of clearing a path for the cutting wheels, I provide in advance of each of them a pair of sweep or rake teeth preferably shaped, as shown in Fig. 1, and made of resilient material. The rake teeth 53 for the side cutting wheels are comparatively large and have their upper ends attached to the ends of a transverse rod 54 secured to a cross bar 55 upon the bottom of the wagon body and having a centrally disposed crank portion 56 to bear upon the bottom of said body, as shown. The teeth 53 have their upper ends bent to form coils 57 which receive the rod 54 and said ends are also bent to form eyes 59 which are arranged in U-shaped clips 59 and held therein by clamping bolts 60, which latter retain the clips 59 on the rod 54, as will be understood on reference to Figs. 2 and 10 of the drawings. This construction renders the teeth sufficiently resilient or yielding and allows them to be adjusted. Sweep or rake teeth 61 are similarly constructed and mounted on a cross rod 62 in the frame 24, such teeth 61 serving to clear a path for the intermediate cutting wheel 22.

The invention as above described and shown in the drawings is especially adapted for use in cutting stalks but by applying to the cutting blades of the wheels the blade attachment 63 shown in Fig. 11 of the drawings, the machine may be adapted for chopping cotton. These auxiliary blades 63 are of U-form and are secured to the wheel blades, as clearly shown in said figure.

From the foregoing description taken in connection with the drawings, it is thought that the construction, operation and advantages of the invention will be readily understood without a more extended explanation.

While I have shown and described in detail the preferred embodiment of my invention, I wish it understood that I do not limit myself to the precise construction set forth and that various changes in the form, proportion and arrangement of parts and in the details of construction may be resorted to within the spirit and scope of the invention.

Having thus described the invention what is claimed is:

1. In a stalk cutting machine, the combination of a body, side cutting wheels carried by said body and adapted to support the same, an intermediate cutting wheel, a spring device for pressing said intermediate cutting wheel downwardly, and rake teeth arranged in advance of the three cutting wheels.

2. The combination with a wagon, of annular rows of cutting blades arranged upon its rear wheels to convert them into side cutting wheels, a vertically movable spring pressed frame carried by the wagon and an intermediate cutting wheel mounted upon said frame.

3. The combination with a wheeled vehicle or the like, of an annular frame detachably connected to one of its supporting wheels and stalk cutting blades upon said frame.

4. A stalk cutting attachment for a wheel comprising a frame for application to a wheel and an annular series of cutting blades upon said frame.

5. The combination with a wheel having a hub and a rim, of a frame having a hub portion engaged with the hub of the wheel and extending therefrom, spokes radiating from said hub portion, a ring uniting the outer portions of said spokes, clips arranged upon the rim of the wheel and an annular series of transverse cutting blades secured to said clips and to said spokes.

6. In a stalk cutting machine, the combination of a body, a supporting wheel therefor, an annular frame connected to said wheel, and an annular series of stalk cutting blades carried by and adjustable transversely of said frame.

7. A stalk cutting attachment for a wheel comprising an annular frame for application to a wheel, and an annular series of cutting blades mounted on said frame and adjustable transversely thereof.

8. A stalk cutting attachment for a wheel comprising an annular frame having a hub portion for engagement with the hub of a wheel, spokes radiating from said hub portion, means uniting said spokes, means uniting the frame to a wheel, and an annular series of cutting blades upon the frame.

9. A stalk cutting attachment for a wheel comprising an annular frame having a hub portion for engagement with the hub of a wheel, spokes radiating from said hub portion, means uniting said spokes, means for engagement with the rim of a wheel, and an annular series of transverse cutting blades between said rim-engaging means and said spokes.

10. A stalk cutting attachment for a wheel comprising an annular frame having a hub portion for engagement with the hub of a wheel, spokes radiating from said hub portion, a ring uniting the outer portions of said spokes, an annular series of clips for engagement with the rim of a wheel, braces between said clips and the hub portion, and an annular series of transverse blades united to said clips and to said spokes.

In testimony whereof I hereunto affix my signature in the presence of two witnesses.

WILLIAM R. LEMONS.

Witnesses:
N. P. WILLIS,
J. D. STEELE.